United States Patent
Laine et al.

(10) Patent No.: US 11,237,003 B2
(45) Date of Patent: Feb. 1, 2022

(54) STELLAR-LANDSCAPE/HORIZON IMAGE NAVIGATION

(71) Applicant: The Charles Stark Draper Laboratory, Inc., Cambridge, MA (US)

(72) Inventors: Juha-Pekka J. Laine, Boston, MA (US); Gregory P. Blasche, Burlington, MA (US); Benjamin F. Lane, Sherborn, MA (US); Daniel M. Meiser, Providence, RI (US); Eric T. Hoke, Somerville, MA (US); Matthew T. Jamula, Wilmington, MA (US); Robin M. A. Dawson, Waltham, MA (US); Stephen P. Smith, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 50 days.

(21) Appl. No.: 16/890,140

(22) Filed: Jun. 2, 2020

(65) Prior Publication Data
US 2020/0300634 A1    Sep. 24, 2020

Related U.S. Application Data

(63) Continuation of application No. 15/888,318, filed on Feb. 5, 2018, now abandoned.
(Continued)

(51) Int. Cl.
*G06K 9/00* (2006.01)
*G01C 21/20* (2006.01)
(Continued)

(52) U.S. Cl.
CPC ............. *G01C 21/20* (2013.01); *G01C 21/02* (2013.01); *G01C 21/04* (2013.01); *G01C 21/203* (2013.01);
(Continued)

(58) Field of Classification Search
CPC ........ G01C 21/02; G01C 21/04; G01C 21/20; G01C 21/203; G06K 9/0063; G06K 9/00664; G06K 9/00791; G06T 2207/10004; G06T 2207/30181; G06T 2207/30204; G06T 2207/30252; G06T 7/74
See application file for complete search history.

(56) References Cited

U.S. PATENT DOCUMENTS 8,284,190 B2    10/2012    Muktinutalapati
8,301,372 B2    10/2012    Herbst
(Continued)

OTHER PUBLICATIONS

SmartBear Software; https://support.smartbear.com/testcomplete/docs/testing-with/checkpoints/regions/how-image-comparison-works.html.

*Primary Examiner* — Ian L Lemieux
(74) *Attorney, Agent, or Firm* — Sunstein LLP

(57) ABSTRACT

An image-based navigation system is arranged to obtain a terrain image of a target terrain from one or more image sensors at a low altitude imaging location. The terrain image includes at least one celestial image feature and at least one terrain feature. Map database information stored in at least one hardware memory device is accessed and compared to the at least one celestial image feature and the at least one terrain feature in the terrain image to determine absolute location coordinates of the imaging location.

18 Claims, 6 Drawing Sheets

Related U.S. Application Data

(60) Provisional application No. 62/460,151, filed on Feb. 17, 2017.

(51) Int. Cl.
   *G06T 7/73* (2017.01)
   *G01C 21/04* (2006.01)
   *G01C 21/02* (2006.01)

(52) U.S. Cl.
   CPC ....... *G06K 9/0063* (2013.01); *G06K 9/00664* (2013.01); *G06K 9/00791* (2013.01); *G06T 7/74* (2017.01); *G06T 2207/10004* (2013.01); *G06T 2207/30181* (2013.01); *G06T 2207/30204* (2013.01); *G06T 2207/30252* (2013.01)

(56) References Cited

U.S. PATENT DOCUMENTS

| | | |
|---|---|---|
| 8,417,000 B1 | 4/2013 | Mendis |
| 8,767,072 B1 | 7/2014 | Rosenwinkel |
| 2007/0286459 A1 | 12/2007 | Gal |
| 2011/0064312 A1 | 3/2011 | Janky |
| 2011/0235923 A1 | 9/2011 | Weisenburger |
| 2013/0243250 A1 | 9/2013 | France |
| 2014/0112536 A1 | 4/2014 | Ely |
| 2015/0254042 A1 | 9/2015 | Seitz |
| 2015/0371431 A1 | 12/2015 | Korb |
| 2016/0027177 A1 | 1/2016 | Hutchinson |
| 2016/0033272 A1 | 2/2016 | Struckhoff |
| 2016/0055671 A1 | 2/2016 | Menozzi |
| 2016/0105609 A1 | 4/2016 | Pettegrew |
| 2016/0188996 A1 | 6/2016 | Modica |
| 2017/0131096 A1* | 5/2017 | Karlov ................. G01C 21/165 |
| 2017/0154233 A1* | 6/2017 | Gallagher ............. G01C 17/34 |
| 2017/0236284 A1 | 8/2017 | Elliethy |
| 2018/0259341 A1 | 9/2018 | Aboutalib |
| 2019/0041217 A1* | 2/2019 | Ben-Moshe ........... G06T 7/248 |
| 2019/0043211 A1 | 2/2019 | Bertrand |
| 2019/0383616 A1* | 12/2019 | Kirschner ................. G01C 9/08 |
| 2021/0092555 A1* | 3/2021 | Mayor ............... G01C 21/3647 |

\* cited by examiner

STELLAR-LANDSCAPE/HORIZON IMAGE NAVIGATION

This application is a continuation of U.S. patent application Ser. No. 15/888,318, filed Feb. 5, 2018, which claims priority from U.S. Provisional Patent Application 62/460,151, filed Feb. 17, 2017. Each of these applications is incorporated herein by reference in its entirety.

TECHNICAL FIELD

The present invention relates to image-based navigation systems using landmark terrain features and celestial image features.

BACKGROUND ART

Current landmark-based image navigation arrangements conduct navigational sightings using one or more imaging devices (e.g., a camera, radar, or other imaging sensors) looking at distinctive terrain features such as buildings, crossroads, airport runways, etc., and compare the terrain image to existing imagery maps in an automated system to provide a solution for imager position and orientation.

Terrain feature matching works best when comparing essentially two-dimensional terrain images to two-dimensional maps. For example, an imaging camera mounted in a high-altitude aircraft looking down at the ground provides two dimensional imagery which is highly suitable for comparison against a two-dimensional imagery map of the same terrain area. The result is an accurate and reliable match and an excellent for position and orientation of the imaging camera.

But terrain feature matching struggles when comparing images with three-dimensional information to two-dimensional maps. For example, an imaging camera mounted on a ground vehicle sees a more three-dimensional version of the world from its real-world imaging location rather than the two-dimensional view from above. If this terrain level image with three-dimensional information is compared against a two-dimensional overhead map of the terrain area, then the comparison matching result is dismal.

SUMMARY

Embodiments of the present invention are directed to image-based navigation arrangements that obtain a terrain image of a target terrain from one or more image sensors at a low altitude imaging location. The terrain image includes at least one celestial image feature and at least one terrain feature. Map database information stored in at least one hardware memory device is accessed and compared to the at least one celestial image feature and the at least one terrain feature in the terrain image to determine absolute location coordinates of the imaging location.

In further specific embodiments, the map database information may include terrain elevation model information characterizing elevation features associated with the target terrain. The at least one terrain feature may include at least one distinctive landmark feature present in the terrain image. For example, comparing the at least one celestial image feature and the at least one terrain feature in the terrain image to the map database information may include determining one or more lines of sight from the one or more image sensors to the at least one distinctive landmark feature and identifying the at least one celestial image feature present in a background portion of the terrain image along the one or more lines of sight. In addition or alternatively, the at least one terrain feature may include at least one terrain horizon feature present in the terrain image. For example, comparing the at least one celestial image feature and the at least one terrain feature in the terrain image to the map database information may include determining one or more lines of sight from the one or more image sensors to the at least one celestial image feature and identifying the at least one terrain horizon feature present in a background portion of the terrain image along the one or more lines of sight.

DETAILED DESCRIPTION

Landmark navigation arrangements can be improved by including three-dimensional terrain elevation information with the imagery map. For example, including a terrain elevation model with elevation information characterizing elevation features associated with the target terrain would make it easier to relate the terrain image from the low altitude imaging sensor(s) to the surrounding real world. For example, the silhouette of a hill in the distance can be matched to the virtual silhouette of the hill generated in the terrain elevation model. In the present context, the term "low altitude" includes ground level imaging locations and any elevated location above ground in which a horizon line is present in the terrain image.

However, for some high-precision navigation applications, approaches using a terrain elevation model still may not be sufficient to accurately determine absolute location coordinates of a given imaging location. Even with a terrain elevation model, the image matching will still suffer from significant rotation and ranging errors arising from slightly different perspectives of the landmark features present in the terrain images—closer in or further out, or rotated to the left or right.

Embodiments of the present invention are directed to a novel image-based navigation approach that matches terrain features and celestial features present in a terrain image for a significantly better combined navigation solution for many applications such as for emergency navigation for hikers, etc.

Figure 1:
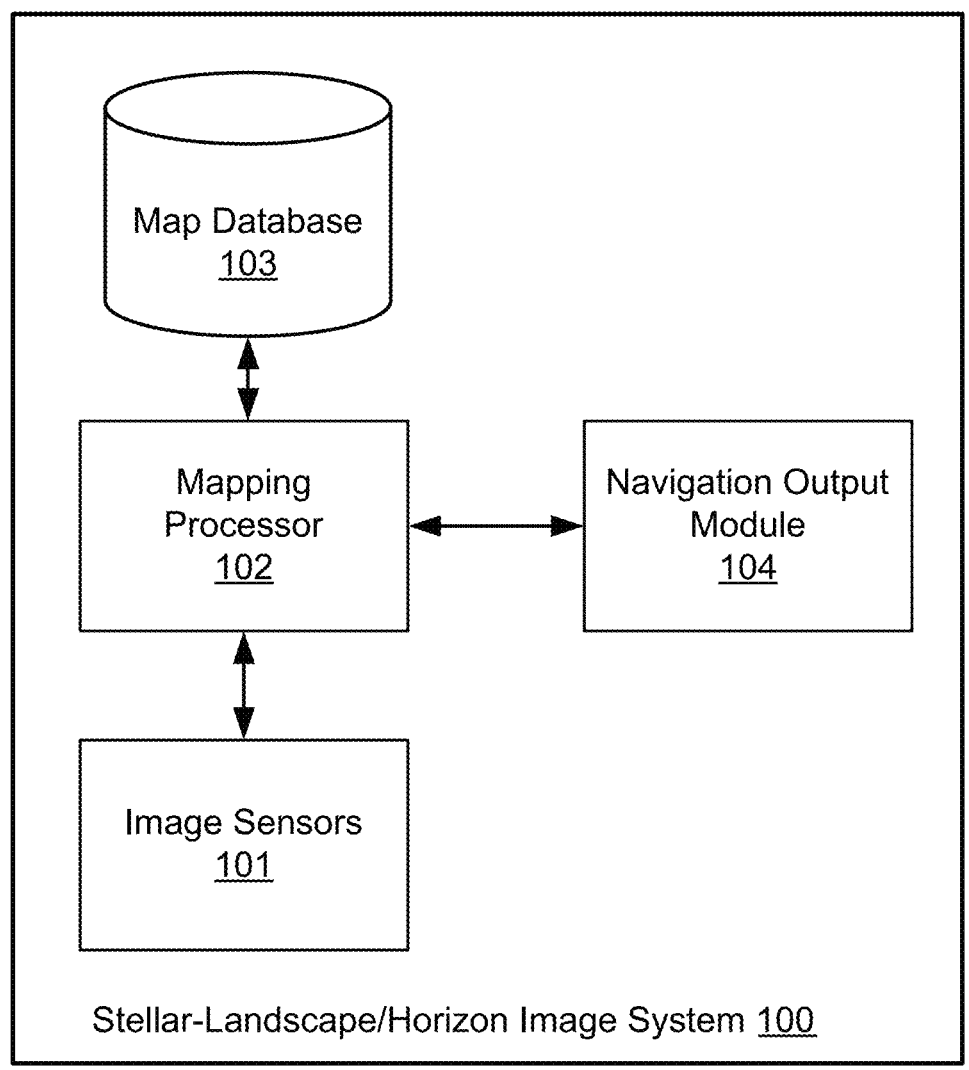
FIG. 1 shows basic functional blocks in an image based navigation system according to an embodiment of the present invention.
Figure 2:
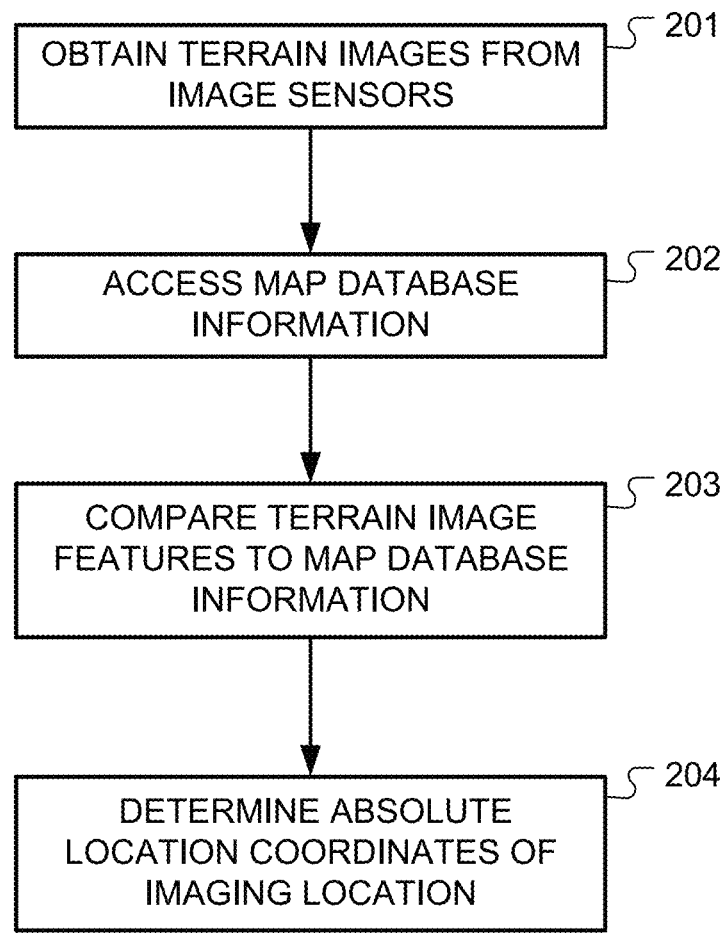
FIG. 2 shows various logical steps in a method of image based navigation according to an embodiment of the present invention.

FIG. 1 show basic functional blocks in an image-based navigation system and FIG. 2 shows various logical steps in a method of image-based navigation according to embodiments of the present invention. A Stellar-Landscape/Horizon Image Navigation System 100 has a mapping processor 102 that includes at least one hardware implanted processor device which is controlled by software instructions to perform the image-based navigation process including instructing one or more image sensors 101—for example, one or more imaging cameras, radar imagers, or other imaging devices—to obtain one more low altitude terrain images of a target terrain from a low altitude imaging location, step 201. The one or more terrain images are characterized by at least one celestial image feature and at least one terrain feature as explained more fully below.

The mapping processor 102 also executes instructions to access map database information stored in a map database 102, step 202, which may include terrain elevation model information as discussed above with elevation information characterizing elevation features associated with the target terrain. The mapping processor 102 then executes instructions to compare the at least one celestial image feature and the at least one terrain feature present in the terrain image to the information in the map database 103, step 203, to determine absolute location coordinates of the imaging location, step 204. The mapping processor 102 also may further execute instructions to provide the location coordinates via a navigation output module 104 for use by higher level system components and/or other systems.

Figure 3:
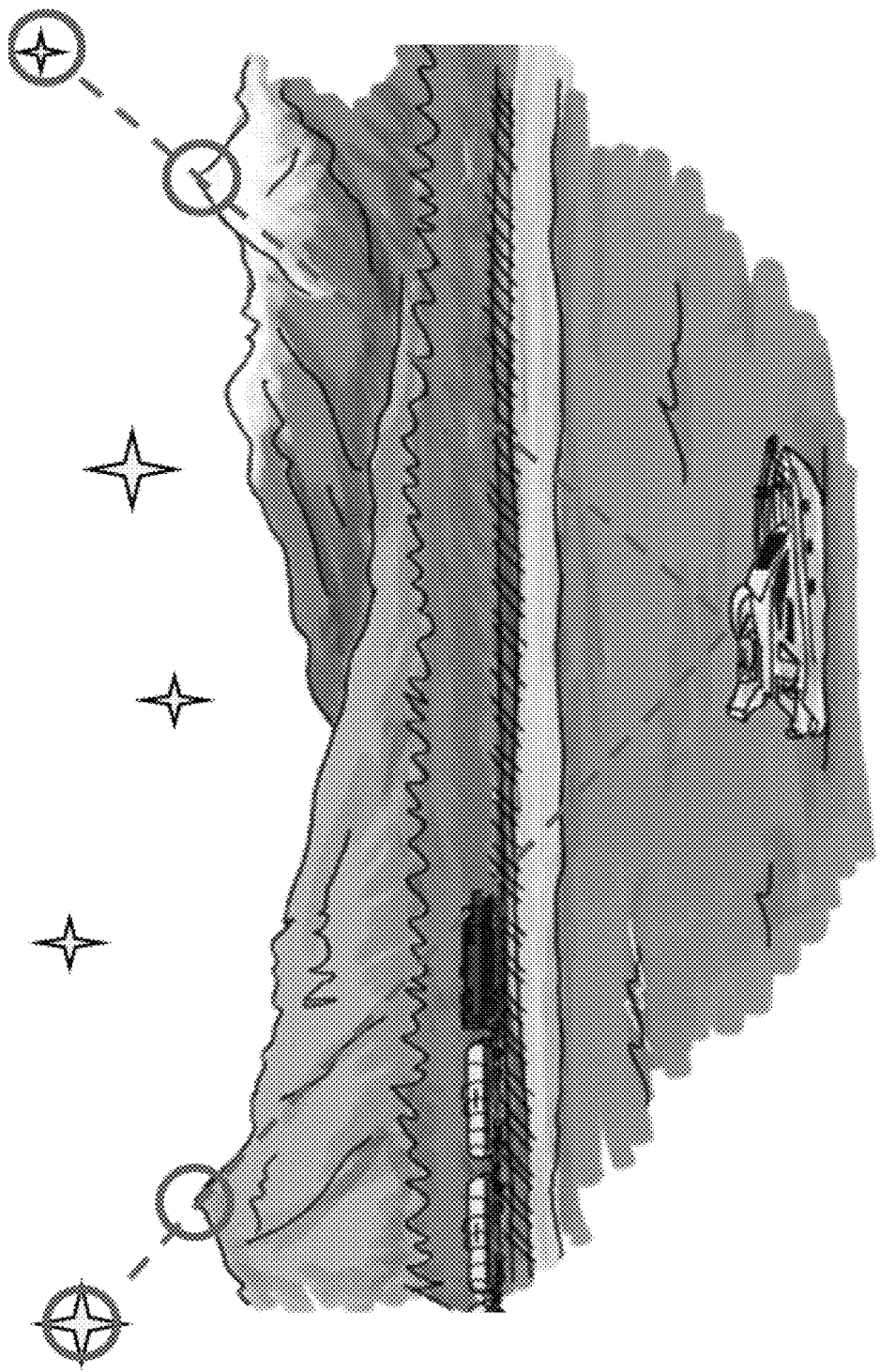
FIG. 3 shows an example of terrain imaging according to an embodiment of the present invention.
Figure 4:
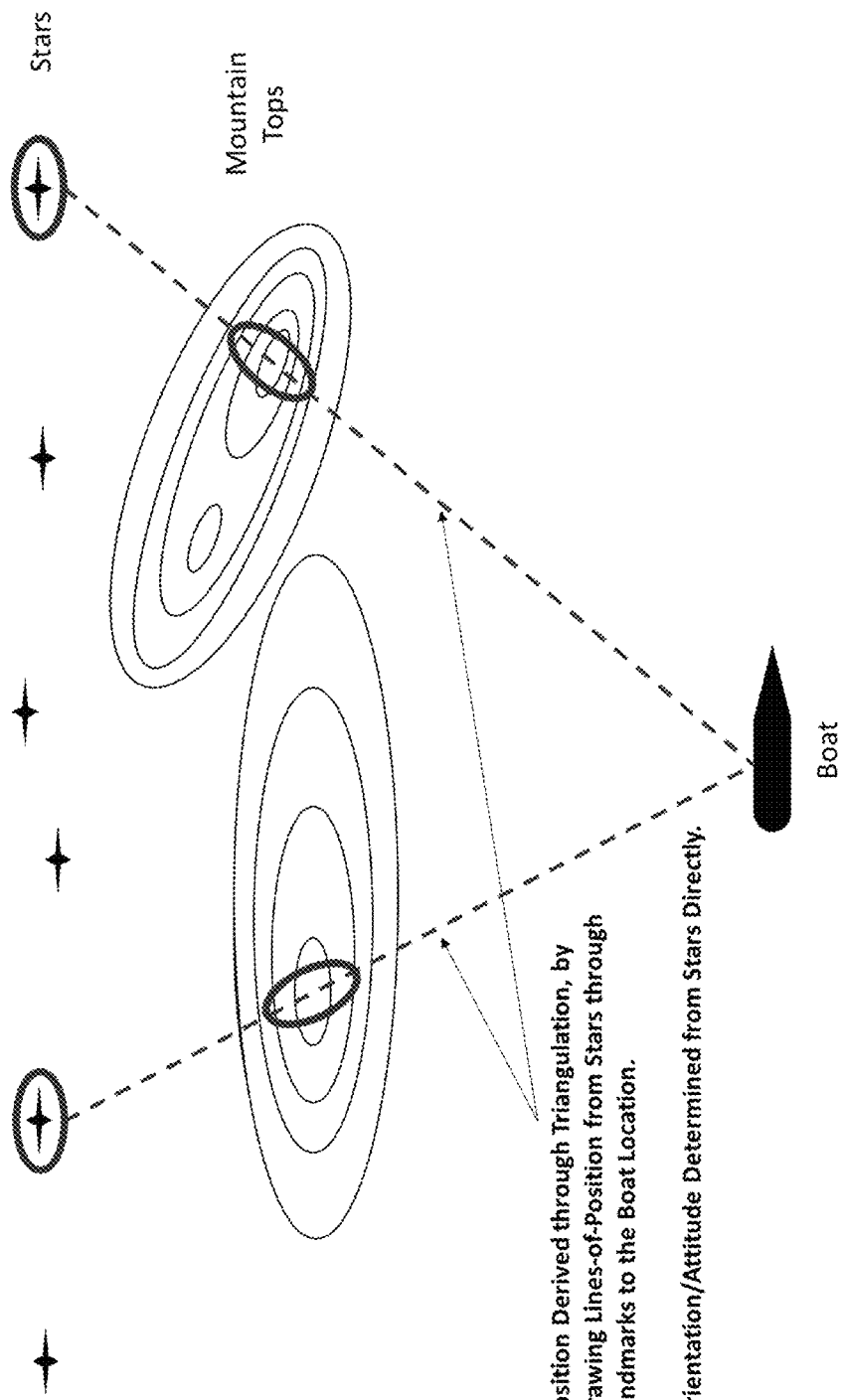
FIG. 4 shows an abstracted version of the scenario in FIG. 3 illustrating the principle of the invention.

FIG. 3 shows an example of terrain imaging according to an embodiment of the present invention, and FIG. 4 shows an abstracted version of the scenario in FIG. 3 illustrating the principle of the invention. In this example, the imaging sensor(s) are located on a boat, and the terrain features include at least one distinctive landmark feature present in the terrain image, here, there are two distinctive mountain peaks. Here the comparing includes determining one or more lines of sight as depicted in FIG. 4 from the image sensor(s) on the boat to the distinctive landmark features of the mountain peaks. Celestial image features—for example, star images—are also present in a background portion of the terrain image along the one or more lines of sight. The locations of the celestial images (the star locations) are known from the celestial feature information stored in the imaging map database together with image time information (e.g., from a clock). Imager orientation information can also be simultaneously obtained from the celestial features in that background portion of the terrain image along the lines of sight. The locations of the distinctive landmark features of the mountain peaks along the lines of sight also are known from the terrain feature information stored in the imaging map dataset (e.g., from a terrain elevation model and/or a conventional map). This information associated with the lines of sight then enables triangulating the position of the imaging sensor(s) (located on the boat) in terms of absolute location coordinates.

Figure 5:
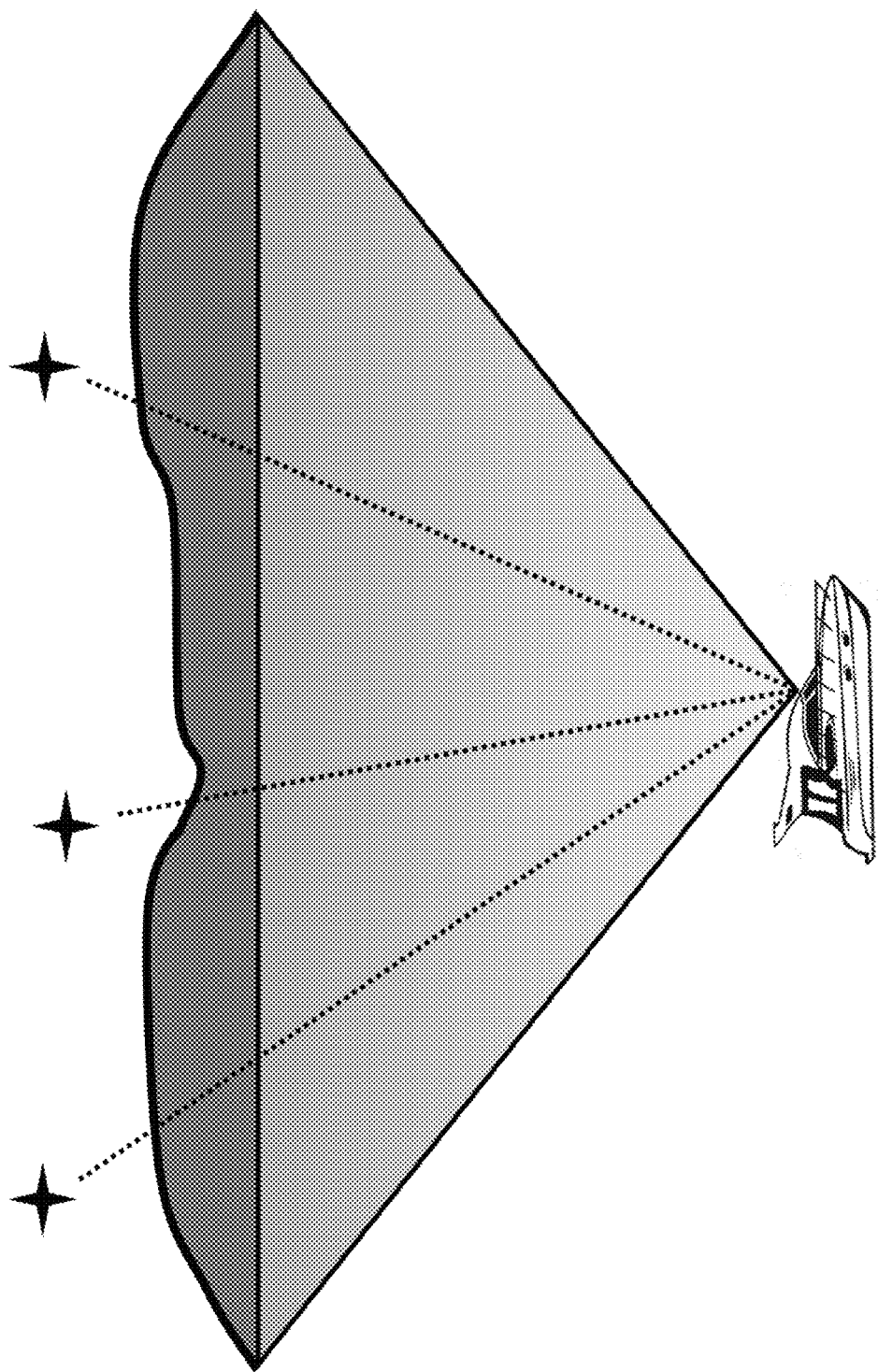
FIG. 5 shows an example of terrain imaging according to another embodiment of the present invention.
Figure 6:
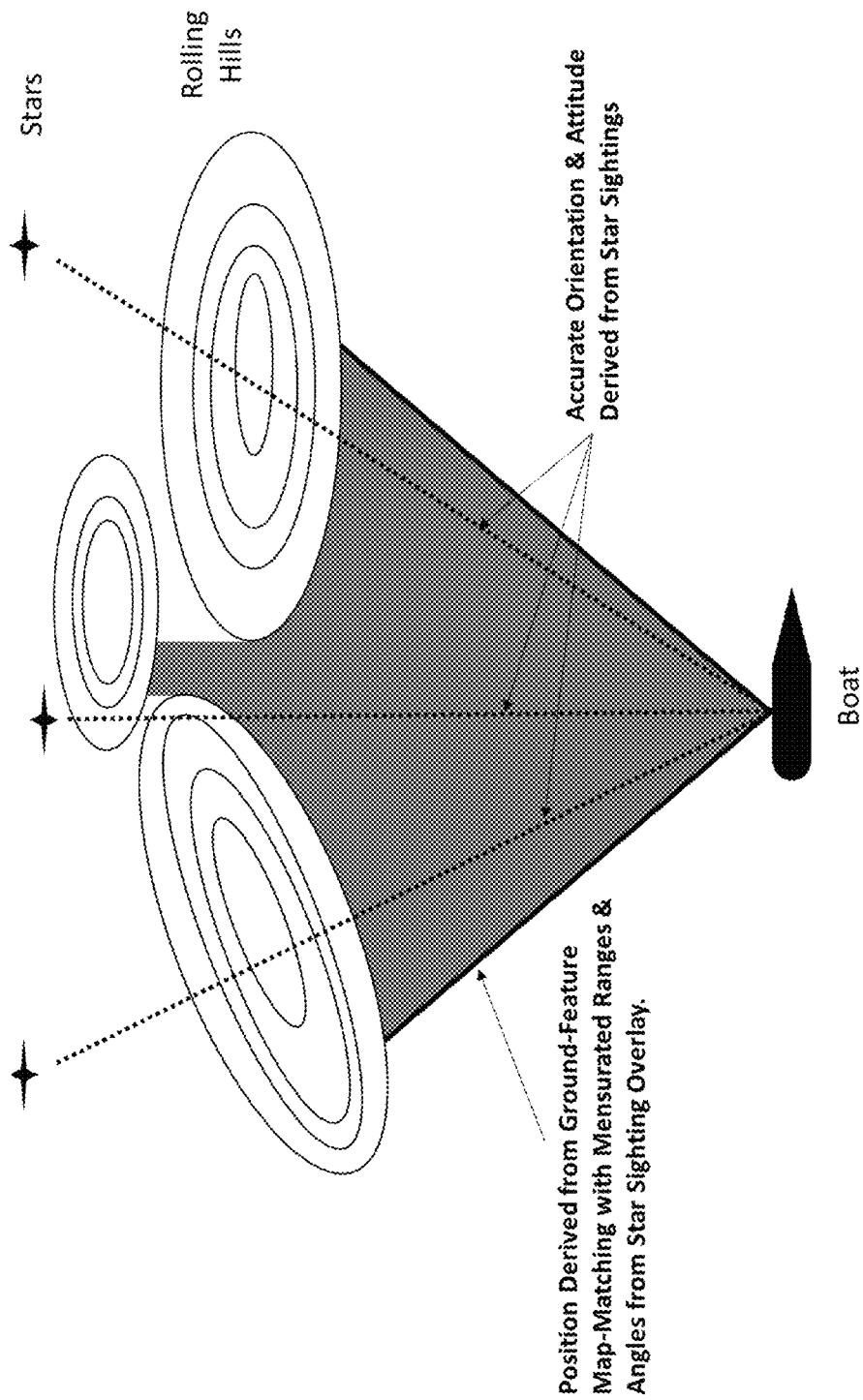
FIG. 6 shows an abstracted version of the scenario in FIG. 6 illustrating the principle of the invention.

FIG. 5 shows another example of terrain imaging according to an embodiment of the present invention, and FIG. 6 shows an abstracted version of the scenario in FIG. 5 illustrating the principle of the invention based on considering celestial feature information together with terrain horizon information. Celestial image features—for example, star images—are used to determine one or more lines of sight as shown, and from those at least one terrain horizon feature present in a background portion of the terrain image also is determined along the one or more lines of sight. Again, the locations of the celestial images (the star locations) are known from the celestial feature information stored in the imaging map database together with image time information (e.g., from a clock), and imager orientation information can also be simultaneously obtained from the celestial feature information present in the terrain image along the lines of sight. This information associated with the lines of sight then enables triangulating the position of the imaging sensor(s) (located on the boat) in terms of absolute location coordinates.

Celestial/horizon image matching may be used in addition to or instead of the celestial/landmark image matching described earlier. Such celestial/horizon image matching may be especially useful where the horizon is ambiguous (trees on hills, etc.) or where the horizon lacks distinctive landmark features. Such celestial/horizon image matching may be especially useful where the horizon is ambiguous (trees on hills, etc.) or where the horizon lacks distinctive landmark features. In the latter case, lines of sight cannot be readily created from distinctive landmark features, and so direct triangulation may not be possible. In such circumstances it is therefore useful to match terrain horizon feature profiles to a terrain elevation model. In that case, the orientation of the imaging sensor (e.g. in a rocking boat) and the distance of the imaging sensor from the target horizon are both very important. The celestial feature information provides a basis for absolute image sensor orientation (azimuth) and the terrain image can then be compared to the map database information in the map database based on the horizon view from exactly the image sensor orientation (azimuth) provided by the celestial feature information. This essentially removes any map matching orientation error. Similarly with respect to the distance from the image sensor to the horizon, the celestial features (stars) can serve as a ruler, the stars are at infinity so their relative distance from each other does not change as the image sensor location moves closer to or further from the target horizon. Therefore, the distance from the image sensor to the horizon profile can be estimated by integrating the entire terrain image horizon view against the fixed star-ruler background.

Embodiments of the invention may be implemented in whole or in part in any conventional computer programming language such as, but not limited to, VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. An image-based navigation system comprising:
   at least one hardware processor; and
   at least one hardware memory device operatively connected to the at least one hardware processor;
   wherein the at least one hardware processor is configured to execute program instructions for:
   obtaining a terrain image of a target terrain from one or more image sensors at a low altitude imaging location, wherein the terrain image includes at least one celestial image feature and at least one terrain feature;
   accessing map database information stored in the at least one hardware memory device; and
   comparing the at least one celestial image feature and the at least one terrain feature in the terrain image to the map database information to determine absolute location coordinates of the imaging location, wherein comparing includes determining one or more lines of sight from the one or more image sensors to either one of (a) the at least one celestial image feature or (b) the at least one terrain feature, and identifying the other one of (a) the at least one celestial image feature or (b) the at least one terrain feature in a background portion of the terrain image along the one or more lines of sight.

2. The system according to claim 1, wherein the map database information includes terrain elevation model information characterizing elevation features associated with the target terrain.

3. The system according to claim 1, wherein the at least one terrain feature includes at least one distinctive landmark feature present in the terrain image.

4. The system according to claim 3, wherein comparing the at least one celestial image feature and the at least one terrain feature in the terrain image to the map database information includes determining the one or more lines of sight from the one or more image sensors to the at least one distinctive landmark feature and identifying the at least one celestial image feature present in a background portion of the terrain image along the one or more lines of sight.

5. The system according to claim 1, wherein the at least one terrain feature includes at least one terrain horizon feature present in the terrain image.

6. The system according to claim 5, wherein comparing the at least one celestial image feature and the at least one terrain feature in the terrain image to the map database information includes determining the one or more lines of sight from the one or more image sensors to the at least one celestial image feature and identifying the at least one terrain horizon feature present in a background portion of the terrain image along the one or more lines of sight.

7. A computer-implemented method employing at least one hardware implemented computer processor for probabilistic landmark navigation, the method comprising:
   operating the at least one hardware processor to execute program instructions for:
   obtaining a terrain image of a target terrain from one or more image sensors at a low altitude imaging location, wherein the terrain image includes at least one celestial image feature and at least one terrain feature;
   accessing map database information stored in at least one hardware memory device;
   comparing the at least one celestial image feature and the at least one terrain feature in the terrain image to the map database information to determine absolute location coordinates of the imaging location, wherein comparing includes determining one or more lines of sight from the one or more image sensors to either one of (a) the at least one celestial image feature or (b) the at least one terrain feature, and identifying the other one of (a) the at least one celestial image feature or (b) the at least one terrain feature in a background portion of the terrain image along the one or more lines of sight.

8. The method according to claim 7, wherein the map database information includes terrain elevation model information characterizing elevation features associated with the target terrain.

9. The method according to claim 7, wherein the at least one terrain feature includes at least one distinctive landmark feature present in the terrain image.

10. The method according to claim 9, wherein comparing the at least one celestial image feature and the at least one terrain feature in the terrain image to the map database information includes determining the one or more lines of sight from the one or more image sensors to the at least one distinctive landmark feature and identifying the at least one celestial image feature present in a background portion of the terrain image along the one or more lines of sight.

11. The method according to claim 7, wherein the at least one terrain feature includes at least one terrain horizon feature present in the terrain image.

12. The method according to claim 11, wherein comparing the at least one celestial image feature and the at least one terrain feature in the terrain image to the map database information includes determining the one or more lines of sight from the one or more image sensors to the at least one celestial image feature and identifying the at least one terrain horizon feature present in a background portion of the terrain image along the one or more lines of sight.

13. A computer program product encoded in a non-transitory computer-readable medium, which when executed by a computer causes the computer to perform the following operations:
   obtaining a terrain image of a target terrain from one or more image sensors at a low altitude imaging location, wherein the terrain image includes at least one celestial image feature and at least one terrain feature;
   accessing map database information stored in at least one hardware memory device;
   comparing the at least one celestial image feature and the at least one terrain feature in the terrain image to the map database information to determine absolute location coordinates of the imaging location, wherein comparing includes determining one or more lines of sight from the one or more image sensors to either one of (a) the at least one celestial image feature or (b) the at least one terrain feature, and identifying the other one of (a) the at least one celestial image feature or (b) the at least one terrain feature in a background portion of the terrain image along the one or more lines of sight.

14. The product according to claim 13, wherein the map database information includes terrain elevation model information characterizing elevation features associated with the target terrain.

15. The product according to claim 13, wherein the at least one terrain feature includes at least one distinctive landmark feature present in the terrain image.

16. The product according to claim 15, wherein comparing the at least one celestial image feature in the terrain image to the map database information includes determining the one or more lines of sight from the one or more image sensors to the at least one distinctive landmark feature and identifying the at least one celestial image feature present in a background portion of the terrain image along the one or more lines of sight.

17. The product according to claim 13, wherein the at least one terrain feature includes at least one terrain horizon feature present in the terrain image.

18. The product according to claim 17, wherein comparing the at least one celestial image feature and the at least one terrain feature in the terrain image to the map database information includes determining the one or more lines of sight from the one or more image sensors to the at least one celestial image feature and identifying the at least one terrain horizon feature present in a background portion of the terrain image along the one or more lines of sight.

* * * * *